(12) United States Patent
Takeyama et al.

(10) Patent No.: US 8,609,005 B2
(45) Date of Patent: Dec. 17, 2013

(54) STRETCHED FILM OF ADDITION POLYMER CONSISTING OF NORBORNENE COMPOUND, PROCESS FOR PRODUCING THE SAME AND USE THEREOF

(75) Inventors: Yoshihisa Takeyama, Tokyo (JP); Atsushi Ishiguro, Tokyo (JP)

(73) Assignee: Zeon Corporation, Tokyo (JP)

( * ) Notice: Subject to any disclaimer, the term of this patent is extended or adjusted under 35 U.S.C. 154(b) by 548 days.

(21) Appl. No.: 12/301,760

(22) PCT Filed: May 15, 2007

(86) PCT No.: PCT/JP2007/059914
§ 371 (c)(1),
(2), (4) Date: Mar. 25, 2009

(87) PCT Pub. No.: WO2007/135887
PCT Pub. Date: Nov. 29, 2007

(65) Prior Publication Data
US 2009/0182117 A1    Jul. 16, 2009

(30) Foreign Application Priority Data
May 23, 2006    (JP) .................................. 2006-142638

(51) Int. Cl.
*B29C 51/04* (2006.01)
*B29C 55/00* (2006.01)
*C08F 10/14* (2006.01)
*C08F 132/08* (2006.01)

(52) U.S. Cl.
USPC ............. 264/291; 264/345; 264/901; 524/81; 524/356; 526/281; 528/396

(58) Field of Classification Search
USPC .................... 264/291, 345, 901; 524/81, 356; 526/281; 528/396
See application file for complete search history.

(56) References Cited

U.S. PATENT DOCUMENTS

| | | | |
|---|---|---|---|
| 5,543,948 A | 8/1996 | Takahashi et al. | |
| 6,844,403 B2 | 1/2005 | Oshima et al. | |
| 2002/0042461 A1 | 4/2002 | Oshima et al. | |
| 2003/0119961 A1 | 6/2003 | Oshima et al. | |
| 2004/0106740 A1* | 6/2004 | Kanamori et al. | 525/326.5 |
| 2005/0107552 A1 | 5/2005 | Oshima et al. | |
| 2006/0217505 A1 | 9/2006 | Oshima et al. | |
| 2007/0123667 A1 | 5/2007 | Oshima et al. | |
| 2007/0231506 A1 | 10/2007 | Ohgaru et al. | |
| 2008/0033133 A1* | 2/2008 | Watanabe et al. | 526/280 |

FOREIGN PATENT DOCUMENTS

| | | | | |
|---|---|---|---|---|
| JP | 05-2108 A | 1/1993 | | |
| JP | 6-59121 A | 3/1994 | | |
| JP | 2000-304920 A | 11/2000 | | |
| JP | 2001-296422 A | 10/2001 | | |
| JP | 2002-196138 A | 7/2002 | | |
| JP | 2002-327024 A | 11/2002 | | |
| JP | 2002327024 A | * 11/2002 | ........... C08F 232/00 |
| JP | 2003-212927 A | 7/2003 | | |
| JP | 2003-215337 A | 7/2003 | | |
| JP | 2004-133209 A | 4/2004 | | |
| JP | 2004133209 A | * 4/2004 | ............... G02B 5/30 |
| JP | 2005-48060 A | 2/2005 | | |
| JP | 2005-060639 A | 3/2005 | | |
| JP | 2005-126514 A | 5/2005 | | |
| JP | 2005-128047 A | 5/2005 | | |
| JP | 2006-18212 A | 1/2006 | | |
| JP | 2007-272100 A | 10/2007 | | |

OTHER PUBLICATIONS

Sigma-Aldrich Co., tetraethyl orthosilicate product data sheet, www.sigmaaldrich.com accessed Sep. 22, 2009.*
Japanese Office Action, dated Aug. 30, 2011, for Japanese Application No. 2008-516606.

* cited by examiner

*Primary Examiner* — Robert C Boyle
(74) *Attorney, Agent, or Firm* — Birch, Stewart, Kolasch & Birch, LLP

(57) ABSTRACT

[Problems] To provide a stretched film of an addition polymer consisting of norbornene compounds favorable for use in manufacturing steps of electric insulating parts and optical parts that exhibits excellent film stability, does not suffer from coloration and has a low linear expansion coefficient.
[Means for Solving Problems] A stretched film of an addition polymer consisting of norbornene compounds produced by stretching a film of the addition polymer consisting of norbornene compounds and having a linear expansion coefficient of at most 50 ppm/° C. The draw ratio is preferably from 1.2 times to 10 times. The stretched film is preferably a non-crosslinked film. A method for producing the stretched film comprises stretching a film of the addition polymer consisting of norbornene compounds at least in one direction in an inert gas atmosphere within a temperature range of the glass transition temperature (Tg) thereof ±50° C., or stretching a film of the addition polymer consisting of norbornene compounds containing an organic compound having a specific boiling point at least in one direction.

2 Claims, No Drawings

STRETCHED FILM OF ADDITION POLYMER CONSISTING OF NORBORNENE COMPOUND, PROCESS FOR PRODUCING THE SAME AND USE THEREOF

TECHNICAL FIELD

The present invention relates to a stretched film of an addition polymer consisting of norbornene compounds having a low linear expansion coefficient and favorable for use for electric insulating parts and optical parts. More precisely, the invention relates to a stretched film of an addition polymer consisting of norbornene compounds that hardly suffers from dimensional changes by fluctuations in ambient temperature or humidity, or by treatments with chemicals or the like, and to its production method and its use.

BACKGROUND ART

A film comprising a norbornene compound polymer is excellent in heat resistance, transparency, chemical resistance and low water absorption, and is therefore useful for optical parts, electric insulating parts, electric/electronic parts, sealants for electronic parts, medical equipment, or packaging materials.

In the field of electric/electronic technology in which norbornene compound polymers have some essential applications, recently, advanced functions of electronic appliances have come to require high-density electric wiring and high-definition structuring of display devices for high-speed electric signal transmission.

Accordingly, films for use in these applications are required to have dimensional stability, especially dimensional stability to temperature changes, namely, to have a low linear expansion coefficient, and concretely, they are required to have a linear expansion coefficient of lower than 50 ppm/° C.

Regarding norbornene compound polymer films having a low linear expansion coefficient, Patent References 1 and 2 report that, after an alkoxysilyl group-bearing norbornene compound is copolymerized and formed into a film, its linear expansion coefficient may be reduced to about 40 ppm/° C. by crosslinking reaction between the alkoxysilyl groups. However, in this method, the crosslinking operation to be attained by exposing the film to water vapor is troublesome and, in addition, the addition of a crosslinking promoter may cause coloration of the film and may detract from the film stability in high-temperature environments.

Accordingly, a norbornene compound polymer film having a low linear expansion coefficient not according to the method is desired.

There are many reports relating to retardation plates and retardation compensatory films produced by stretching and orienting a film of a cyclic olefin resin such as a norbornene-based resin, for the above-mentioned optical applications and others (for example, Patent References 3 to 8).

These patent references say that addition polymers of a norbornene monomer and addition copolymers thereof with ethylene or the like can also be used, in which, however, only ring-opening polymers of a norbornene monomer were actually formed into films and their effects were confirmed.

However, the ring-opening polymers of a norbornene compound have a glass transition temperature of not higher than 200° C., and their heat resistance is limited. In general, the double bond remaining after the ring-opening polymerization is hydrogenated, but even after hydrogenation, there still remains some but minor double bonds in the molecular chains, and when exposed to high temperatures, the polymers may often cause problems of coloration and the like.

Patent Reference 1: JP-A 2005-48060
Patent Reference 2: JP-A 2005-126514
Patent Reference 3: JP-A 5-2108
Patent Reference 4: JP-A 6-59121
Patent Reference 5: JP-A 2000-304920
Patent Reference 6: JP-A 2001-296422
Patent Reference 7: JP-A 2004-133209
Patent Reference 8: JP-A 2006-18212

DISCLOSURE OF THE INVENTION

Problems that the Invention is to Solve

Accordingly, desired are a norbornene compound polymer film excellent in film stability, free from a problem of coloration and having a small linear expansion coefficient, which is favorably usable in a production process for electric insulating parts and optical parts, and a simple method for producing it.

Means for Solving the Problems

The number-average molecular weight of the polymers described in the above-mentioned Patent References 3 to 8 is around 100,000 or so. The inventors of the present invention actually tried forming films of a norbornene compound addition polymer having a number-average molecular weight on the level as above according to a solution casting method, but it was difficult to obtain the films as their mechanical strength was insufficient and they were cracked.

For forming films of a norbornene compound addition polymer having a high molecular weight according to a melt extrusion method, a relatively high-temperature extrusion condition must be employed as the glass transition temperature of the polymer is high, and as a result, the obtained films may be greatly colored and are unsuitable to optical applications and the like.

Accordingly, the present inventors have further continued assiduous studies of norbornene compound addition polymers and, as a result, have found that a film of an addition polymer consisting of norbornene compounds, when stretched under a specific condition, gives a film excellent in film stability, free from a problem of coloration and having a significantly reduced linear expansion coefficient; and on the basis of this finding, the inventors have completed the present invention.

According to the invention, there is provided a stretched film of an addition polymer consisting of norbornene compounds produced by stretching a film of an addition polymer consisting of norbornene compounds and having a linear expansion coefficient of at most 50 ppm/° C.

Preferably, the draw ratio of the stretched film of an addition polymer consisting of norbornene compounds of the invention is from 1.2 times to 10 times.

Preferably, the stretched film of an addition polymer consisting of norbornene compounds of the invention is a non-crosslinked film.

The stretched film of an addition polymer consisting of norbornene compounds of the invention can be favorably obtained from a film of an addition polymer consisting of norbornene compounds having a number-average molecular weight of at least 100,000.

The stretched film of an addition polymer consisting of norbornene compounds of the invention can be favorably obtained from a film of an addition polymer consisting of norbornene compounds formed according to a solution casting method.

The stretched film of an addition polymer consisting of norbornene compounds having a linear expansion coefficient of at most 50 ppm/° C. of the invention can be obtained by stretching a film of an addition polymer consisting of norbornene compounds in at least one direction in an inert gas atmosphere within a temperature range of the glass transition temperature (Tg) thereof ±50° C.

The stretched film of an addition polymer consisting of norbornene compounds of the invention can be obtained by stretching, at least in one direction, a film of an addition polymer consisting of norbornene compounds containing an organic compound having a boiling point of not higher than 250° C. in an amount of from 1 to 200% by weight relative to the addition polymer consisting of norbornene compounds.

In the production method of the stretched film of an addition polymer consisting of norbornene compounds of the invention, preferably, the film of the addition polymer consisting of norbornene compounds is formed according to a solution casting method, and the organic compound having a boiling point of not higher than 250° C. is the same compound as that used in the film formation according to the solution casting method for the film of the addition polymer consisting of norbornene compounds.

According to the invention, there is also provided a stretched film of an addition polymer consisting of norbornene compounds laminated with a transparent conductive film.

Further according to the invention, there are provided optical parts, electric insulating parts, electric/electronic parts, sealants for electronic parts, medical equipment or packaging materials comprising the stretched film of an addition polymer consisting of norbornene compounds.

Advantages of the Invention

According to the invention, a stretched film of a norbornene compound polymer excellent in film stability, free from a problem of coloration and having a small linear expansion coefficient can be obtained according to a simple production method.

The stretched film of an addition polymer consisting of norbornene compounds of the invention is excellent in film stability and free from a problem of coloration and has a linear expansion coefficient of at most 50 ppm/° C., and is therefore useful as optical parts, electric insulating parts, electric/electronic parts, sealants for electronic parts, medical equipment and packaging materials.

BEST MODE FOR CARRYING OUT THE INVENTION

The stretched film of an addition polymer consisting of norbornene compounds of the invention (this may be hereinafter simply referred to as "the stretched film of the invention") is a film produced by stretching a film of an addition polymer consisting of norbornene compounds, and has a linear expansion coefficient of at most 50 ppm/° C.

The addition polymer consisting of norbornene compounds for use in producing the stretched film of an addition polymer consisting of norbornene compounds (this may be hereinafter simply referred to as an addition polymer consisting of norbornene compounds for use in the invention") is an addition polymer comprising a norbornene compound alone as the constitutive element.

The addition polymer consisting of norbornene compounds for use in the invention may be a homopolymer of a norbornene compound or a copolymer of two or more different types of norbornene compounds; however, addition polymers copolymerized with any other monomer than norbornene compounds such as α-olefin or the like cannot attain the object of the invention.

The addition polymer consisting of norbornene compounds for use in the invention comprises a repetitive structural unit represented by general formula (1):

[Formula 1]

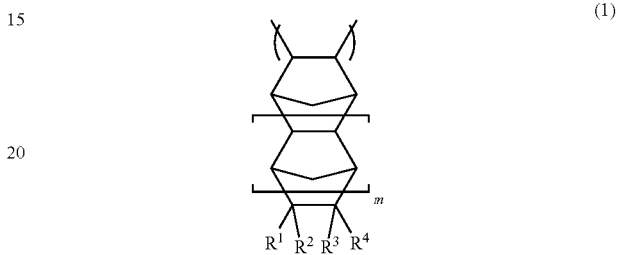

In the formula, $R^1$ to $R^4$ each independently represent a hydrogen atom; a functional group containing a heteroatom of Group 15 or 16 of the Periodic Table or a silicon atom; or a hydrocarbon group having from 1 to 20 carbon atoms and optionally having the functional group. Further, $R^1$ to $R^4$ may bond to each other to form a ring. m indicates an integer of 0 or 1 or more.

The heteroatom of Group 15 or 16 of the Periodic Table that the functional group represented by $R^1$ to $R^4$ contains is not specifically limited, and its examples include an oxygen atom, a nitrogen atom and a sulfur atom.

Specific examples of the functional group include oxygen atom-bearing functional groups such as hydroxy, alkoxy, aryloxy, carbonyl, hydroxycarbonyl, alkoxycarbonyl, aryloxycarbonyl and acid anhydride; nitrogen atom-bearing functional groups such as amino, alkylamino, arylamino and cyano; functional groups bearing an oxygen atom and a nitrogen atom such as aminocarbonyl, alkylaminocarbonyl and arylaminocarbonyl; sulfur atom-bearing functional groups such as mercapto, alkylthio and arylthio; functional groups bearing an oxygen atom and a sulfur atom such as thiocarbonyl; silicon atom-bearing functional groups such as silyl, alkylsilyl, arylsilyl and alkoxysilyl; functional groups bearing an oxygen atom and a silicon atom such aryloxysilyl; and the like.

The hydrocarbon group represented by $R^1$ to $R^4$ may be any one having from 1 to 20 carbon atoms and is not specifically limited. It may be an aliphatic hydrocarbon group or an aromatic hydrocarbon group, and may be a saturated group or an unsaturated group. Further, the aliphatic hydrocarbon group may be linear, branched or cyclic.

The hydrocarbon group may have the above-mentioned functional group, and a part of carbon atoms therein may be replaced by a heteroatom of Group 15 or 16 of the Periodic Table or a silicon atom.

In general formula (1), the ring to be formed by $R^1$ to $R^4$ bonding to each other may be saturated or unsaturated, and may be a monocyclic ring or a condensed ring.

The addition polymer consisting of norbornene compounds for use in the invention may be obtained by addition polymerization of a norbornene compound represented by general formula (2):

[Formula 2]

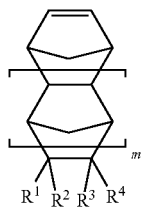

(2)

In the formula, $R^1$ to $R^4$ and m are the same as in general formula (1).

In the invention, the norbornene compounds are preferably bicyclo[2.2.1]hept-2-enes of general formula (2) where m is 0, and tetracyclo[6.2.1.1$^{3,6}$.0$^{2,7}$]dodec-4-enes where m is 1.

The bicyclo[2.2.1]hept-2-enes to be used for production of the addition polymer consisting of norbornene compounds for use in the invention are not specifically limited, and their specific examples include the following:

Unsubstituted or hydrocarbon substituent-bearing bicyclo[2.2.1]hept-2-enes such as bicyclo[2.2.1]hept-2-ene, 5-methylbicyclo[2.2.1]hept-2-ene, 5-ethylbicyclo[2.2.1]hept-2-ene, 5-butylbicyclo[2.2.1]hept-2-ene, 5-hexylbicyclo[2.2.1]hept-2-ene, 5-decylbicyclo[2.2.1]hept-2-ene, 5-cyclohexylbicyclo[2.2.1]hept-2-ene, 5-cyclopentylbicyclo[2.2.1]hept-2-ene, 5-ethylidenebicyclo[2.2.1]hept-2-ene, 5-vinylbicyclo[2.2.1]hept-2-ene, 5-propenylbicyclo[2.2.1]hept-2-ene, 5-cyclohexenylbicyclo[2.2.1]hept-2-ene, 5-cyclopentenylbicyclo[2.2.1]hept-2-ene, 5-phenylbicyclo[2.2.1]hept-2-ene, 5,6-dimethylbicyclo[2.2.1]hept-2-ene, bicyclo[2.2.1]hepta-2,5-diene, benzonorbornadiene, tetracyclo[9.2.1.0$^{2,10}$.0$^{3,8}$]tetradeca-3,5,7,12-tetraene (also referred to as "1,4-methano-1,4,4a,9a-tetrahydro-9H-fluorene"), tetracyclo[10.2.1.0$^{2,11}$.0$^{4,9}$]pentadeca-4,6,8,13-tetraene (also referred to as "1,4-methano-1,4,4a,9,9a,10-hexahydroanthracene"), dicyclopentadiene, methyldicyclopentadiene and dihydrodicyclopentadiene (also referred to as "tricyclo[5.2.1.0$^{2,6}$]dec-8-ene");

alkoxycarbonyl group-bearing bicyclo[2.2.1]hept-2-enes such as methyl 5-norbornene-2-carboxylate, ethyl 5-norbornene-2-carboxylate, methyl 2-methyl-5-norbornene-2-carboxylate and ethyl 2-methyl-5-norbornene-2-carboxylate;

bicyclo[2.2.1]hept-2-enes bearing a hydroxycarbonyl group or an acid anhydride group such as 5-norbornene 2-carboxylic acid, 5-norbornene-2,3-dicarboxylic acid and 5-norbornene-2,3-dicarboxylic acid anhydride;

hydroxy group-bearing bicyclo[2.2.1]hept-2-enes such as 5-hydroxy-2-norbornene, 5-hydroxymethyl-2-norbornene, 5,6-di(hydroxymethyl)-2-norbornene, 5,5-di(hydroxymethyl)-2-norbornene, 5-(2-hydroxyethoxycarbonyl)-2-norbornene and 5-methyl-5-(2-hydroxyethoxycarbonyl)-2-norbornene;

hydrocarbonyl group-bearing bicyclo[2.2.1]hept-2-enes such as 5-norbornene-2-carbaldehyde;

bicyclo[2.2.1]hept-2-enes bearing an alkoxycarbonyl group and a hydroxycarbonyl group such as 3-methoxycarbonyl-5-norbornene-2-carboxylic acid;

carbonyloxy group-bearing bicyclo[2.2.1]hept-2-enes such as 5-norbornen-2-yl acetate, 2-methyl-5-norbornen-2-yl acetate, 5-norbornen-2-yl acrylate and 5-norbornen-2-yl methacrylate;

bicyclo[2.2.1]hept-2-enes having a nitrogen atom-bearing functional group such as 5-norbornene-2-carbonitrile, 5-norbornene-2-carboxamide and 5-norbornene-2,3-dicarboimide;

bicyclo[2.2.1]hept-2-enes having a silicon atom-bearing functional group such as 5-trimethoxysilyl-2-norbornene and 5-triethoxysilyl-2-norbornene.

Tetracyclo[6.2.1.1$^{3,6}$.0$^{2,7}$]dodec-4-enes to be used for production of the addition polymer consisting of norbornene compounds for use in the invention are not specifically limited, and their specific examples include the following:

Unsubstituted or hydrocarbon substituent-bearing tetracyclo[6.2.1.1$^{3,6}$.0$^{2,7}$]dodec-4-enes such as tetracyclo[6.2.1.1$^{3,6}$.0$^{2,7}$]dodec-4-ene, 9-methyltetracyclo[6.2.1.1$^{3,6}$.0$^{2,7}$]dodec-4-ene, 9-ethyltetracyclo[6.2.1.1$^{3,6}$.0$^{2,7}$]dodec-4-ene, 9-cyclohexyltetracyclo[6.2.1.1$^{3,6}$.0$^{2,7}$]dodec-4-ene, 9-cyclopentyltetracyclo[6.2.1.1$^{3,6}$.0$^{2,7}$]dodec-4-ene, 9-methylidenetetracyclo[6.2.1.1$^{3,6}$.0$^{2,7}$]dodec-4-ene, 9-ethylidenetetracyclo[6.2.1.1$^{3,6}$.0$^{2,7}$]dodec-4-ene, 9-vinyltetracyclo[6.2.1.1$^{3,6}$.0$^{2,7}$]dodec-4-ene, 9-propenyltetracyclo[6.2.1.1$^{3,6}$.0$^{2,7}$]dodec-4-ene, 9-cyclohexenyltetracyclo[6.2.1.1$^{3,6}$.0$^{2,7}$]dodec-4-ene, 9-cyclopentenyltetracyclo[6.2.1.1$^{3,6}$.0$^{2,7}$]dodec-4-ene and 9-phenyltetracyclo[6.2.1.1$^{3,6}$.0$^{2,7}$]dodec-4-ene;

alkoxycarbonyl group-bearing tetracyclo[6.2.1.1$^{3,6}$.0$^{2,7}$]dodec-4-enes such as methyl tetracyclo[6.2.1.1$^{3,6}$.0$^{2,7}$]dodec-9-ene-4-carboxylate and methyl 4-methyltetracyclo[6.2.1.1$^{3,6}$.0$^{2,7}$]dodec-9-ene-4-carboxylate;

tetracyclo[6.2.1.1$^{3,6}$.0$^{2,7}$]dodec-4-enes bearing hydroxycarbonyl group or an acid anhydride group such as tetracyclo[6.2.1.1$^{3,6}$.0$^{2,7}$]dodec-9 ene-4-carboxylic acid, tetracyclo[6.2.1.1$^{3,6}$.0$^{2,7}$]dodec-9-ene-4,5-dicarboxylic acid, and tetracyclo[6.2.1.1$^{3,6}$.0$^{2,7}$]dodec-9-ene-4,5-dicarboxylic acid anhydride;

hydroxy group-bearing tetracyclo[6.2.1.1$^{3,6}$.0$^{2,7}$]dodec-4-enes such as tetracyclo[6.2.1.1$^{3,6}$.0$^{2,7}$]dodec-9-ene-4-methanol and tetracyclo[6.2.1.1$^{3,6}$.0$^{2,7}$]dodec-9-en-4-ol;

hydrocarbonyl group-bearing tetracyclo[6.2.1.1$^{3,6}$.0$^{2,7}$]dodec-4-enes such as tetracyclo[6.2.1.1$^{3,6}$.0$^{2,7}$]dodec-9-ene-4-carbaldehyde;

carbonyloxy group-bearing tetracyclo[6.2.1.1$^{3,6}$.0$^{2,7}$]dodec-4-enes such as 9-tetracyclo[6.2.1.1$^{3,6}$.0$^{2,7}$]dodec-4-enyl acetate, 9-tetracyclo[6.2.1.1$^{3,6}$.0$^{2,7}$]dodec-4 enyl acetate, 9-tetracyclo[6.2.1.1$^{3,6}$.0$^{2,7}$]dodec-4-enyl acrylate, and 9-tetracyclo[6.2.1.1$^{3,6}$.0$^{2,7}$]dodec-4-enyl methacrylate;

tetracyclo[6.2.1.1$^{3,6}$.0$^{2,7}$]dodec-4-enes having a nitrogen atom-bearing functional group such as tetracyclo[6.2.1.1$^{3,6}$.0$^{2,7}$]dodec-9-ene-4-carbonitrile, tetracyclo[6.2.1.1$^{3,6}$.0$^{2,7}$]dodec-9-ene-4-carboxamide and tetracyclo[6.2.1.1$^{3,6}$.0$^{2,7}$]dodec-9-ene-4,5-dicarboimide;

tetracyclo[6.2.1.1$^{3,6}$.0$^{2,7}$]dodec-4-enes having a silicon atom-bearing functional group such as 4-trimethoxysilyltetracyclo[6.2.1.1$^{3,6}$.0$^{2,7}$]dodec-9-ene and 4-triethoxysilyltetracyclo[6.2.1.1$^{3,6}$.0$^{2,7}$]dodec-9-ene.

Preferably, the addition polymer consisting of norbornene compounds for use in the invention has a structural unit derived from unsubstituted or hydrocarbon substituent-bearing bicyclo[2.2.1]hept-2-enes or unsubstituted or hydrocarbon substituent-bearing tetracyclo[6.2.1.1$^{3,6}$.0$^{2,7}$]dodec-4-enes, in an amount of at least 70% of all the repetitive structural units, more preferably at least 80%, even more preferably at least 85%, still more preferably at least 95%, from the viewpoint of the dimensional stability and the solubility thereof. Preferably, the hydrocarbon substituent has from 1 to 3 carbon atoms.

Especially preferably, the addition polymer consisting of norbornene compounds for use in the invention consists of the structural unit of general formula (1).

The polymer consisting of the structural unit of general formula (1) has high heat resistance, and has a glass transition temperature (Tg) of preferably not lower than 200° C., more preferably not lower than 220° C., even more preferably not lower than 240° C.

In case where the glass transition temperature thereof is lower than 200° C., and when the film is used in some optical parts or electric insulating parts, then its heat resistance may be insufficient. On the other hand, the uppermost limit of the glass transition temperature is not specifically defined, but when it is higher than 400° C., then the polymer may decompose and its glass transition temperature may be difficult to measure.

Regarding the molecular weight of the addition polymer consisting of norbornene compounds for use in the invention, its number-average molecular weight (Mn) is preferably at least 100,000 in terms of polystyrene. The number-average molecular weight is more preferably at most 500,000, even more preferably from 120,000 to 450,000, still more preferably from 150,000 to 400,000. When the number-average molecular weight is too small, then the mechanical properties of the polymer may be poor and the polymer may be difficult to form into films. On the other hand, when the number-average molecular weight is too large, its solution viscosity may be too high and the polymer may be difficult to produce.

The method for producing the addition polymer consisting of norbornene compounds for use in the invention is not specifically limited.

The polymerization catalyst may be any catalyst for addition polymerization of a norbornene compound, and is not specifically limited; and, for example, it may be a polymerization catalyst comprising a combination of a transition metal catalyst of Group 10 such as nickel or palladium, and a co-catalyst such as an aluminum compound or a boron compound, as described in JP-T 11-505880, WO00/20472 and JP-A 2001-980359.

Above all, addition polymers consisting of norbornene compounds produced by polymerization by using a palladium atom-containing polymerization catalyst are preferred as they have excellent mechanical properties.

In case where the addition polymer consisting of norbornene compounds for use in the invention obtained according to the above-mentioned method has an olefinic unsaturated bond, the olefinic unsaturated bond may be hydrogenated. The method for hydrogenation is not specifically limited.

The draw ratio of the stretched film of an addition polymer consisting of norbornene compounds of the invention is preferably from 1.2 times to 10 times, more preferably from 1.5 times to 6 times, even more preferably from 2 times to 4 times.

When the draw ratio is smaller than 1.2 times, then the linear expansion coefficient of the film could not be effectively reduced; but when larger than 10 times, then the film thickness may be difficult to control and the film may be cut during stretching.

The thickness of the stretched film of an addition polymer consisting of norbornene compounds of the invention is generally from 1 to 1,000 μm, preferably from 2 to 500 μm. Strictly, "film" and "sheet" shall be differentiated from each other depending on the thickness thereof; but in the invention, the "film" is a concept that includes both "film" and "sheet".

The stretched film of an addition polymer consisting of norbornene compounds of the invention is preferably a non-crosslinked film.

As not crosslinked, the film may be readily stretched to a high draw ratio without being cut or broken during stretching.

Whether the film is crosslinked or not crosslinked may be distinguished based on their solubility in a solvent. Concretely, 1 g of a film is immersed in 100 g of the solvent used in the solution casting method mentioned below, then shaken at room temperature for one full day, and those not keeping the film form are non-crosslinked ones.

The stretched film of an addition polymer consisting of norbornene compounds of the invention has a linear expansion coefficient of at most 50 ppm/° C. The linear expansion coefficient is preferably at most 45 ppm/° C., more preferably at most 40 ppm/° C.

The stretched film of an addition polymer consisting of norbornene compounds of the invention having a linear expansion coefficient of at most 50 ppm/° C. can be obtained by stretching a film of an addition polymer consisting of norbornene compounds.

The thickness of the film of an addition polymer consisting of norbornene compounds for use in the invention is not specifically limited, and may be generally from 1 to 1,000 μm, preferably from 2 to 500 μm. When its thickness is less than 1 μm, then the film strength may be low and the film may often have faults; but stretched films having a thickness of more than 1,000 μm are difficult to produce at a high draw ratio.

The film of an addition polymer consisting of norbornene compounds for use in the invention can be favorably produced according to a solution casting method. For producing a norbornene compound polymer film, there is known a melt extrusion method in addition to the solution casting method. In the melt extrusion method, however, a film forming condition of a considerably high temperature must be employed since the glass transition temperature of the norbornene compound polymer is high, and if so, the obtained film may be greatly colored and is unsuitable for optical applications and the like.

The solution casting method is a method comprising dissolving or dispersing an addition polymer consisting of norbornene compounds in an organic solvent to obtain a solution, then casting the resulting solution onto a support such as a metal drum, a steel belt, a polyester film made from polyethylene terephthalate (PET), polyethylene naphthalate (PEN) or the like, or a polytetrafluoroethylene belt, using a die or a coater, thereafter removing the solvent, drying the polymer, and peeling the film from the support.

For the production, also employable is a method comprising applying the solution onto a support by spraying, brushing, roll spin coating, dipping or the like, then drying it to remove the solvent, and peeling the film from the support. Repeated coating makes it possible to control the thickness, the surface smoothness, and the like.

The solvent for use in the solution casting method may be any solvent capable of dissolving or dispersing an addition polymer consisting of norbornene compounds, and is not specifically limited.

Its specific examples include aliphatic hydrocarbons such as pentane, hexane and heptane; alicyclic hydrocarbons such as cyclopentane, cyclohexane, methylcyclohexane, dimethylcyclohexane, ethylcyclohexane, decahydronaphthalene, bicycloheptane, tricyclodecane, hexahydroindene and cyclooctane; aromatic hydrocarbons such as benzene, toluene and xylene; halogen-containing aliphatic hydrocarbon solvents such as dichloromethane, chloroform and 1,2-dichloroethane; halogen-containing aromatic hydrocarbon solvents such as chlorobenzene and dichlorobenzene; nitrogen-containing solvents such as nitromethane, nitrobenzene and acetonitrile; aliphatic ethers such as diethyl ether and tetrahydrofuran; aromatic ethers such as anisole and phenetole; and the like.

Of those solvents, preferred are aromatic hydrocarbons, aliphatic hydrocarbons, alicyclic hydrocarbons, ethers and halogen-containing solvents.

Also preferably, a small amount of a solvent not dissolving an addition polymer consisting of norbornene compounds may be added to the solvent for the purpose of lowering the solution viscosity. The solvent of the type includes cellosolve solvents such as methyl cellosolve, ethyl cellosolve and 1-methoxy-2-propanol; ketone solvents such as diacetone alcohol, acetone, cyclohexanone, methyl ethyl ketone and 4-methyl-2-pentanone; ester solvents such as methyl lactate and ethyl lactate; and alcohol solvents such as 1-pentanol and 1-butanol.

The concentration of the addition polymer consisting of norbornene compounds dissolved or dispersed in the solvent is preferably from 0.1 to 50% by weight, more preferably from 0.2 to 45% by weight, even more preferably from 0.5 to 40% by weight. When the polymer concentration is less than the lowermost limit of the above range, then the film could hardly secure its thickness, and there may occur some problems that the film could hardly have surface smoothness owing to foaming or the like caused by solvent evaporation. On the other hand, when the concentration is more than the above-mentioned uppermost limit, then the solution viscosity may be too high and the thickness and the surface of the obtained film could hardly be uniform.

The viscosity of the solution at room temperature is generally from 1 to 1,000,000 mPa·s, preferably from 10 to 100,000 mPa·s, more preferably from 100 to 50,000 mPa·s, even more preferably from 1,000 to 40,000 mPa·s.

In the solution casting method, the film may be formed generally at room temperature; but for lowering the solution viscosity and for increasing the polymer solubility, the polymer solution may be previously heated. The heating temperature may vary depending on the boiling point of the solvent used, but may be from 30° C. to 250° C., preferably from 40° C. to 200° C.

The drying step in the solution casting method is not specifically limited, and the film may be dried in an ordinary method, for example, according to a method of leading the film to pass through a drying furnace via many rollers. However, when foams are formed during solvent evaporation in the drying step, then the properties of the film may be greatly worsened; and therefore, for evading this, the drying step is preferably a multi-stage step of two or more stages in which the temperature and the air flow rate may be suitably controlled in each stage.

Preferably, the film of the addition polymer consisting of norbornene compounds is stretched in an inert gas atmosphere within a temperature range of from the glass transition temperature (Tg) of the film of the addition polymer consisting of norbornene compounds ±50° C.

The stretching temperature is preferably within a range of the glass transition temperature (Tg) of the film of the addition polymer consisting of norbornene compounds ±45° C., more preferably within a range of the glass transition temperature (Tg) ±40° C.

Stretched within a temperature range of the glass transition temperature (Tg) of the film of the addition polymer consisting of norbornene compounds ±50° C., the film is not cut or broken and can give a stretched film having a desired linear expansion coefficient.

When the film of the addition polymer consisting of norbornene compounds is stretched within the above-mentioned temperature range in an atmosphere other than inert gas atmospheres such as an air atmosphere, then the draw ratio could not increase and the obtained stretched film may be colored, have poor mechanical strength, and may be brittle.

In case where the film is stretched in the above-mentioned inert gas atmosphere, the amount of the residual solvent (concretely, it is the same as the solvent used in forming the film of the addition polymer consisting of norbornene compounds according to a solution casting method) in the film of the addition polymer consisting of norbornene compounds is preferably at most 5,000 ppm by weight relative to the addition polymer consisting of norbornene compounds, more preferably at most 1,000 ppm by weight.

The stretched film of the invention may also be obtained by stretching at least in one direction an addition polymer consisting of norbornene compounds film that contains an organic compound having a boiling point at normal pressure of not higher than 250° C. in an amount of from 1 to 200% by weight relative to the addition polymer consisting of norbornene compounds.

The lowermost limit of the stretching temperature is not specifically limited, and in general, it may be room temperature. Its uppermost limit is not also specifically limited, but from the viewpoint of the operability and the like, the uppermost limit is preferably the glass transition temperature (Tg) of the film of the addition polymer consisting of norbornene compounds.

According to the above-mentioned stretching method, the apparent glass transition temperature of the film of the addition polymer consisting of norbornene compounds containing an organic compound lowers, and therefore, the film can be stretched at a temperature lower than the glass transition temperature of the addition polymer consisting of norbornene compounds itself. After the stretching, the organic solvent may be removed by drying, and a stretched film of an addition polymer consisting of norbornene compounds may be thereby obtained.

The stretching method above enables low-temperature stretching, in which, therefore, the risk of oxidation deterioration of the film of the addition polymer consisting of norbornene compounds is small, and the stretching atmosphere may not be inert.

The organic compound having a boiling point of not higher than 250° C. to be incorporated in the film of the addition polymer consisting of norbornene compounds may be any organic compound having a boiling point of not higher than 250° C. and capable of uniformly penetrating into the addition polymer consisting of norbornene compounds, and is not specifically limited. The boiling point of the organic compound is preferably from 40 to 230° C., more preferably from 50 to 200° C.

Specific examples of the organic compound to be applied to the film of the addition polymer consisting of norbornene compounds may be the same as those used in forming the film of the addition polymer consisting of norbornene compounds according to a solution casting method.

In the production method for the stretched film of an addition polymer consisting of norbornene compounds of the invention, when the film of the addition polymer consisting of norbornene compounds is formed according to a solution casting method, then the organic compound having a boiling point of not higher than 250° C. is preferably the same as the compound used in forming the film of the addition polymer consisting of norbornene compounds according to the solution casting method. In the case, it is easy to produce a stretched film of an addition polymer consisting of norbornene compounds from the film of the addition polymer consisting of norbornene compounds.

The amount of the organic compound in the film of the addition polymer consisting of norbornene compounds is preferably from 1 to 200% by weight relative to the addition polymer consisting of norbornene compounds, more preferably from 2 to 150% by weight, even more preferably from 3 to 100% by weight.

The method of controlling the amount of the organic compound to be contained in the film of the addition polymer consisting of norbornene compounds within the above-mentioned range is not specifically limited. Concretely employable are a method of making the solvent remain in the film within the above-mentioned range during the film formation according to the solution casting method, a method of making the organic compound penetrate into the film of the addition polymer consisting of norbornene compounds, and the like.

Control of the boiling point and the amount of the organic compound within the above-mentioned ranges makes it possible to produce a stretched film having a desired linear expansion coefficient with no problems of film breakage, coloration, deterioration and the like.

The stretching is attained at least in one direction.

Monoaxial stretching gives a film having birefringence. Biaxial stretching gives a film having a small birefringence.

The stretching speed is not specifically limited, and preferably, it is from 10 to 5,000%/min, more preferably from 20 to 2,000%/min.

For the stretching method, any apparatus may be used capable of uniformly stretching a film monoaxially or biaxially. For example, a film piece is stretched monoaxially or biaxially with a stretching apparatus, for example, a tensilon or the like. In case where a roll film is stretched in the machine direction, employable is a method of using two pairs of nip rolls having a different peripheral speed; and when it is stretched in the cross direction, employable is a tenter method.

The stretching is preferably attained in an inert gas atmosphere. Thus, a stretched film having a desired linear expansion coefficient can be obtained with no problems of film breakage, coloration, deterioration and the like.

The inert gas is not specifically limited, for which are usable nitrogen, carbon dioxide gas, rare gases and the like.

After stretched, the residual solvent (the above-mentioned organic compound having a boiling point of not higher than 250° C. and others) in the stretched film may be reduced to a desired range according to a conventional known drying method of heating, vacuum drying or the like.

Preferably, the stretched film of an addition polymer consisting of norbornene compounds of the invention contains an antioxidant. The use of an antioxidant may enhance the stability of the film at high temperatures.

The antioxidant is not specifically limited, but is preferably at least one selected from the group consisting of phenolic antioxidants, lactone-based antioxidants and phosphorus-containing antioxidants. For increasing the antioxidative effect thereof, at least two of these are preferably used as combined.

Specific examples of the phenolic antioxidants include 2,6-di-t-butyl-4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), pentaerythritol tetrakis[3-(3,5-di-t-butyl-4-hydroxyphenyl)propionate], octadecyl 3-(3,5-di-t butyl-4-hydroxyphenyl)propionate, 3,3',3",5,5',5"-hexa-t-butyl-a,a',a"-(mesitylene-2,4,6-tri yl)-tri-p-cresol, 1,3,5-tris(3,5-di-t-butyl-4-hydroxybenzyl)-1,3,5-triazine-2,4,6(1H,3H,5H)-trione, and the like.

Specific examples of the phosphorus-containing antioxidants include tris(4-methoxy-3,5-diphenyl) phosphite, tris (nonylphenyl) phosphite, tris(2,4-di-t-butylphenyl) phosphite, tris[2-[[2,4,8,10-tetra-t-butyldibenzo[d,f][1,3,2] dioxaphosphephin-6-yl]oxy]ethyl]amine, and the like.

Specific examples of the lactone-based antioxidants include a reaction product of 3-hydroxy-5,7-di-t-butyl-benzofuran-2-one with o-xylene, and the like.

The amount of the antioxidant to be added is not specifically limited, but is preferably from 0.01 to 10% by weight of the addition polymer consisting of norbornene compounds, more preferably from 0.05 to 5% by weight.

Also preferably, a heat-resistant processing stabilizer, a UV absorbent, a light stabilizer and other stabilizers may be added to the film of the addition polymer consisting of norbornene compounds.

Examples of the heat-resistant processing stabilizer include hydroxylamine-based heat-resistant processing stabilizers; sulfur-containing heat-resistant processing stabilizers such as didodecyl 3,3'-thiodipropionate and dioctadecyl 3,3'-thiodipropionate; and the like.

Examples of the UV absorbent include benzotriazole-based UV absorbents, triazine based UV absorbents, benzophenone-based UV absorbents, and the like.

Examples of the light stabilizer include benzoate based light stabilizers, hindered amine-based light stabilizers, and the like.

If desired, various additives may be incorporated in the film of the addition polymer consisting of norbornene compounds.

The additives include an inorganic filler, an organic filler, a processing stabilizer, an antistatic agent, a near-IR absorbent, a colorant such as a dye or a pigment, a phosphor, a lubricant, a plasticizer, a flame retardant, a crosslinking agent, and the like.

For adding the antioxidant and other additives to the stretched film of an addition polymer consisting of norbornene compounds, employable is any method capable of uniformly dissolving or dispersing the antioxidant and other additives in the film of the invention. Preferred is a method that comprises dissolving or dispersing the additive in the solution for solution casting of an addition polymer consisting of norbornene compounds to be used in producing the stretched film, and casting the solution into a film, as the method is simple.

The stretched film of an addition polymer consisting of norbornene compounds of the invention has a total light transmittance of at least 70%, preferably at least 80%, more preferably at least 85%, and therefore, it is favorably used for optical materials and parts for display devices.

[Transparent Conductive Film-laminated Film]

The stretched film of an addition polymer consisting of norbornene compounds of the invention may be one laminated with a transparent conductive film (hereinafter this may be referred to as "transparent conductive film-laminated film").

As the material for forming the transparent conductive film layer (transparent conductive film), generally used are metals such as Sn, In, Ti, Pb, Au, Pt and Ag; or their oxides and the like, for example, indium tin oxide (ITO), aluminum oxide, silicon oxide, titanium oxide, zinc oxide, tungsten oxide, aluminum nitride, silicon nitride, titanium nitride, cadmium sulfide, zinc sulfide and zinc selenide. A coating film of such a simple metal may be formed on a substrate, optionally oxidized, to give a transparent conductive film layer. From the beginning of film formation, a metal oxide layer may be formed by adhesion; but at the beginning of film formation, a coating layer of a simple metal or a lower metal oxide may be formed, and thereafter this may be processed for oxidation such as heating oxidation, anodic oxidation or liquid-phase oxidation for clarification to be made transparent.

The transparent conductive film layer may be formed by adhering a sheet, film or the like having any other transparent conductive film layer to the stretched film of an addition polymer consisting of norbornene compounds; or it may be directly formed on the stretched film of an addition polymer consisting of norbornene compounds by a plasma polymerization method, a sputtering method, a vacuum vapor deposition method, a metal-plating or ion-plating method, a spraying method, an electrolytic deposition method or the like. The thickness of the transparent conductive film layer may be suitably determined depending on the desired properties, and is not specifically limited; but in general, it may be from 10 to 10,000 angstroms, preferably from 50 to 5,000 angstroms.

In case where a transparent conductive film layer is directly formed on the stretched film of an addition polymer consisting of norbornene compounds of the invention, an adhesive layer and an anchor coat layer may be formed, if desired, between the film of the addition polymer consisting of norbornene compounds and the transparent conductive film layer. The adhesive layer may be formed, using a heat-resistant resin such as an epoxy resin, polyimide, polybutadiene, a phenolic resin or polyether ether ketone. The anchor coat layer may be formed by a known curing method of, for example, UV curing or thermal curing, using an anchor coat agent containing an acrylic prepolymer such as epoxy diacrylate, urethane diacrylate, polyester diacrylate or the like.

In the transparent conductive film-laminated film of the invention, an adhesive layer may be provided between the film of the addition polymer consisting of norbornene compounds and the transparent conductive film for the purpose of enhancing the film smoothness and enhancing the adhesiveness to the transparent conductive film. The adhesive layer may be formed by application of a resin varnish and subsequent drying for solvent removal. In this case, preferred is a varnish containing a resin having film formability after solvent removal, namely, a solid resin, from the viewpoint of uniform coating. Specific examples of the resin for this include photocurable resins, for example, so-called acrylic prepolymers such as epoxy diacrylate, urethane diacrylate or polyester diacrylate; epoxy-based (including o-cresol-novolak or bisphenol-type) epoxy-based, urethane-based, acryl-based, urea-based, melamine-based or unsaturated polyester-based thermosetting resins; electron beam-curable resins; and the like. Of those, preferred are photocurable resins in view of the productivity and the cost thereof.

For forming the curable resin coating film, there are known a gravure coating method, a reverse roll coating method, a kiss roll coating method and the like; and any of those methods are employable herein.

The transparent conductive film-laminated film of the invention may have a gas-barrier layer on the side opposite to the transparent conductive film. The gas-barrier layer may be formed of an inorganic material or an organic material. Usable inorganic materials include silicon oxide, aluminum oxide, indium oxide, and the like; and organic materials include polyvinyl alcohol, an ethylene-vinyl alcohol copolymer, polyamide, and the like.

The thickness of the gas-barrier layer is preferably from 100 to 2,000 angstroms when it is formed of an inorganic material, and from 500 to 10,000 angstroms when formed of an organic material.

The inorganic material may be formed into a film according to a known method such as a sputtering method, an ion-plating method, a resistance heating method or a CVD method. The organic material may be formed into a film by dissolving it in a solvent and applying and drying it according to the above-mentioned coating method.

An adhesive layer may be provided between the film and the gas-barrier layer.

Further, a protective coat layer may be laminated on the gas-barrier layer for protecting it. The protective coat layer is preferably formed according to the same method as that for the above-mentioned adhesive layer.

[Optical Parts]

The stretched film of an addition polymer consisting of norbornene compounds of the invention is favorably used for optical parts, for example, for color filter substrates as well as light-guiding plates, protective films, polarizing films, retardation films, touch panels, transparent electrode substrates, optical recording substrates for CD, MD, DVD and the like, TFT substrates, liquid-crystal display substrates, organic EL display substrates, and also light transmission waveguides, optical device sealants, and the like.

Above all, it is favorably used for parts of display devices, concretely color filter substrates, light-guiding plates, protective films, polarizing films, retardation films, touch panels, transparent electrode substrates, TFT substrates, liquid-crystal display substrates, organic EL display substrates, and the like.

[Color Filter]

A color filter may be obtained by laminating a color filter layer on a color filter substrate comprising the stretched film of an addition polymer consisting of norbornene compounds of the invention or the transparent conductive film-laminated film of the invention. For the lamination, employable is any known method such as a pigment dispersion method, a dyeing method, an electrodeposition method, a printing method, a transfer method, or the like.

The color filter may be used as a color filter for liquid-crystal display devices; and further, it may also be used as a part of components of color displays, liquid-crystal display devices, and the like.

The stretched film of an addition polymer consisting of norbornene compounds of the invention is usable not only for optical parts but also for electric insulating parts, electric/electronic parts, sealants for electronic parts, medical equipment, and packaging materials.

[Electric Insulating Parts]

The stretched film of an addition polymer consisting of norbornene compounds of the invention has excellent heat resistance and electric properties and suffers from little dimensional changes in a high-temperature treatment or a chemical treatment, and therefore it is most favorable for electric insulating parts.

The electric insulating parts include covering materials for electric wires and cables; insulating materials for OA appliances such as computers, printers and duplicators; insulating parts of flexible printed boards; and the like. In particular, the film is favorable for flexible printed boards.

[Electric/Electronic Parts]

As electric/electronic parts, the film may be used for containers, trays, carrier tapes, separation films, washing chambers, pipes and tubes, as well as sealants for semiconductor devices, sealants for integrated circuits, overcoating materials, and the like.

[Medical Equipment]

As medical equipment, the film may be used for containers for chemicals, infusion bags, sample containers, sterilization containers, tubes, and the like.

EXAMPLES

The invention is described more concretely with reference to the following Examples and Comparative Examples. The invention should not be limited to these Examples. In Examples, part and % are all by weight, unless otherwise specifically indicated.

In Examples and Comparative Examples, the samples were tested and evaluated according to the methods mentioned below.

(1) Weight-Average Molecular Weight (Mw) and Number-Average Molecular Weight (Mn) of Polymer:

Measured in terms of polystyrene through gel permeation chromatography (GPC) using tetrahydrofuran or chloroform as a solvent.

(2) Copolymerization Ratio of Polymer:

Determined through $^1$H-NMR analysis.

(3) Glass Transition Temperature (Tg):

Determined as the temperature at the inflection point of the storage modulus E' measured in kinematic viscoelastometry. In kinematic viscoelastometry, used is a viscoelasticity spectrometer (Seiko Instruments' trade name "EXSTAR DMS6100"). The frequency is 10 Hz; the heating speed is 5° C./min; the excitation mode is a single waveform; the excitation amplitude is 5.0 µm. Using the device, the temperature at the inflection point of the storage modulus E' is measured.

(4) Method of Distinction Between Crosslinked and Non-Crosslinked of Stretched Film of Addition Polymer Consisting of Norbornene Compounds:

A film of 6 cm×2 cm×100 µm in size (about 1 g) is stretched, then dipped in 100 g of a solvent, toluene used in the solution casting method, shaken at room temperature for one full day, and checked as to whether or not it could keep the film form. When the film form is kept as such, the film is a crosslinked one; but when the film form is not kept, the film is a non-crosslinked one.

(5) Solvent Content in Film of Addition Polymer Consisting of Norbornene Compounds:

A film of an addition polymer consisting of norbornene compounds is dissolved in a solvent other than the solvent used in preparing the film of the addition polymer consisting of norbornene compounds, and then quantitatively analyzed through gas chromatography.

(6) Total Light Transmittance of Stretched Film of Addition Polymer Consisting of Norbornene Compounds:

A film of the addition polymer consisting of norbornene compounds having a thickness of 100 µm is stretched, and then analyzed with a UV-visible spectrometer (JASCO's trade name, "V-550") within a wavelength range of from 400 to 700 nm.

(7) Linear Expansion Coefficient of Film of Addition Polymer Consisting of Norbornene Compounds and Stretched Film of Addition Polymer Consisting of Norbornene Compounds:

Using a thermal mechanical analyzer THA (Mettler Toledo's trade name "SDTA840"), a sample piece of a film having a size of 15.4 mm in length and 5.95 mm in width is stood straight and fixed, and a load of 1 g is applied thereto, using a probe. This is heated from room temperature at 5° C./min, and the temperature (horizontal axis)-elongation of film piece (vertical axis) is plotted on a graph, and from the inclination of the elongation of the film piece between 30° C. and 200° C., the linear expansion coefficient of the film sample is obtained.

Reference Example 1

(Polymerization)

0.77 part of (allyl)palladium(tricyclohexylphosphine) chloride and 1.14 parts of lithium tetrakis(pentafluorophenyl) borate were put into a nitrogen-purged glass reactor, and then 2 parts of toluene was successively added to give a catalyst liquid.

Next, 1,650 parts of bicyclo[2.2.1]hept-2-ene (NB; molecular weight=94), 915 parts of 5-ethylbicyclo[2.2.1] hept-2-ene (EtNB; molecular weight=122), 1,300 parts of styrene as a molecular weight-controlling agent, and 7,200 parts of toluene as a polymerization solvent were fed into a nitrogen-purged pressure glass container equipped with a stirrer, and the above catalyst liquid was added to it to start polymerization. After reacted at 45° C. for 4.5 hours, the polymerization liquid was poured into a large amount of methanol to thereby completely precipitate the polymer, which was then collected by filtration, washed and thereafter dried under reduced pressure at 50° C. for 18 hours to give 2,462 parts of a polymer (a).

The number-average molecular weight (hereinafter this may be abbreviated as "Mn") of the polymer (a) was 222,000; the weight-average molecular weight (hereinafter this may be abbreviated as "Mw") thereof was 725,000; the composition ratio of NB unit/EtNB unit in the polymer (a) was 70/30 (mol/mol); and the glass transition temperature (Tg) of the polymer (a) was 281° C.

A 10% toluene solution of the polymer (a) was prepared, and, as antioxidants, 0.5% relative to the polymer (a) of octadecyl 3-(3,5-di-t-butyl-4-hydroxyphenyl)propionate, 1.0% relative to the polymer (a) of tris(2,4-di-t-butylphenyl) phosphite, and 0.3% relative to the polymer (a) of a reaction product of 3-hydroxy-5,7-di-t-butyl-benzonfuran-2-one with o-xylene were added and dissolved therein. The solution was cast onto a flat polytetrafluoroethylene sheet, and toluene was evaporated away at room temperature for 24 hours in an air flow, and then this was dried in vacuum at 80° C. for 24 hours and at 150° C. for 24 hours, thereby producing a cast film (1) having a thickness of 100 µm and having a residual solvent content of less than 500 ppm.

The film of the addition polymer consisting of norbornene compounds (1) had a linear expansion coefficient of 64 ppm/° C.

Reference Example 2

(Polymerization)

0.77 part of (allyl)palladium(tricyclohexylphosphine) chloride and 1.14 parts of lithium tetrakis(pentafluorophenyl) borate were put into a nitrogen-purged glass reactor, and then 2 parts of toluene was successively added to give a catalyst liquid.

Next, 1,650 parts of bicyclo[2.2.1]hept-2-ene (NB; molecular weight=94), 900 parts of 5-ethylidenebicyclo [2.2.1]hept-2-ene (EdNB; molecular weight=120), 1,200 parts of styrene as a molecular weight-controlling agent, and 7,200 parts of toluene as a polymerization solvent were fed into a nitrogen-purged pressure glass container equipped with a stirrer, and the above catalyst liquid was added to it to start polymerization. After reacted at 45° C. for 4.5 hours, the polymerization liquid was poured into a large amount of methanol to thereby completely precipitate the polymer, which was then collected by filtration, washed and thereafter dried under reduced pressure at 50° C. for 18 hours to give 2,423 parts of a polymer (b).

The number-average molecular weight (hereinafter this may be abbreviated as "Mn") of the polymer (b) was 157,000; the weight-average molecular weight (hereinafter this may be abbreviated as "Mw") thereof was 487,000; the composition ratio of NB unit/EdNB unit in the polymer (b) was 70/30 (mol/mol); and the glass transition temperature (Tg) of the polymer (b) was 284° C.

A 10% toluene solution of the polymer (b) was prepared, and, as antioxidants, 0.5% relative to the polymer (b) of octadecyl 3-(3,5-di-t-butyl-4-hydroxyphenyl)propionate, 1.0% relative to the polymer (b) of tris(2,4-di-t-butylphenyl) phosphite, and 0.3% relative to the polymer (b) of a reaction product of 3-hydroxy-5,7-di-t-butyl-benzofuran-2-one with o-xylene were added and dissolved therein. The solution was cast onto a flat polytetrafluoroethylene sheet, and toluene was evaporated away at room temperature for 24 hours in an air flow, and then this was dried in vacuum at 80° C. for 24 hours and at 150° C. for 24 hours, thereby producing a cast film (2) having a thickness of 100 μm and having a residual solvent content of less than 500 ppm.

The film of the addition polymer consisting of norbornene compounds (2) had a linear expansion coefficient of 60 ppm/° C.

Example 1

The film of the addition polymer consisting of norbornene compounds (1) obtained in Reference Example 1 was set in an electric monoaxial stretcher (Imoto Seisakusho's trade name "IMC-16BE"). The sample chamber was purged with nitrogen, then heated up to 310° C., and the film was stretched by 2 times at a stretching speed of 55%/min.

The obtained stretched film dissolved completely in toluene, not leaving the film form, and therefore it was a non-crosslinked one. Its linear expansion coefficient was 41 ppm/° C. Its light transmittance was 91%.

Example 2

The film of the addition polymer consisting of norbornene compounds (2) obtained in Reference Example 2 was immersed in diethylene glycol ethylmethyl ether (boiling point, 179° C.) for 30 minutes, whereby diethylene glycol ethylmethyl ether was infiltrated into the polymer film (2) in an amount of 50% relative to the polymer film. The obtained, solvent-containing film was stretched by 2 times at 100° C. in an air atmosphere at a stretching speed of 55%/min, using an electric monoaxial stretcher (Imoto Seisakusho's trade name "IMC-16BE"). In the thus-stretched state, diethylene glycol ethylmethyl ether was evaporated away from the film in a nitrogen atmosphere at 180° C. for 3 hours, and then the film was further dried in vacuum at 180° C. for 18 hours, thereby giving a stretched film having a thickness of 45 μm and having a residual solvent content of less than 500 ppm.

The obtained stretched film dissolved completely in toluene, not leaving the film form, and therefore it was a non-crosslinked one. Its linear expansion coefficient was 35 ppm/° C. Its light transmittance was 91%.

Comparative Example 1

The film of the addition polymer consisting of norbornene compounds (1) obtained in Reference Example 1 was set in an electric monoaxial stretcher (Imoto Seisakusho's trade name "IMC-16BE"). In a sample chamber having an air atmosphere, this was heated up to 310° C. and stretched at a stretching speed of 55%/min, but the film was cut at a draw ratio of less than 1.2 times.

The obtained stretched film yellowed, and its mechanical strength was extremely low and the film was brittle. Accordingly, the linear expansion coefficient of the film could not be determined.

Comparative Example 2

The film of the addition polymer consisting of norbornene compounds (1) obtained in Reference Example 1 was set in an electric monoaxial stretcher (Imoto Seisakusho's trade name "IMC-16BE"). In a sample chamber having an air atmosphere, stretching the film was tried at 100° C.; however, the film could not almost be stretched but was cut at a draw ratio of less than 1.1 times. The linear expansion coefficient of the film was 63 ppm/° C., and the linear expansion coefficient thereof could not be reduced to 50 ppm/° C. or less.

From the results of Examples and Comparative Examples, it is understood that, according to the invention, when a film of the addition polymer consisting of norbornene compounds is stretched in at least one direction within a temperature range of the glass transition temperature (Tg) thereof ±50° C. in an inert gas atmosphere, or when a film of the addition polymer consisting of norbornene compounds containing an organic compound having a boiling point of not higher than 250° C. in an amount of from 1 to 200% by weight relative to the addition polymer consisting of norbornene compounds is stretched in at least one direction, then the film can be stretched into a stretched film at a high draw ratio. The stretched film is a non-crosslinked film, having a small linear expansion coefficient and having an excellent light transmittance.

As opposed to this, it is understood that, when a film of the addition polymer consisting of norbornene compounds is stretched in an air atmosphere, its draw ratio could not be increased, and the obtained film that had been stretched at a low draw ratio yellowed, and its mechanical strength was extremely low, and the film was brittle. Further, when stretching a film of the addition polymer consisting of norbornene compounds not containing an organic compound is tried at a temperature lower than (Tg−50)° C., the film could not be stretched by 1.2 times or more.

The invention claimed is:

1. A method for producing a stretched film comprising an addition polymer consisting of norbornene compounds, which comprises stretching, at least in one direction, a film of: a) the addition polymer consisting of norbornene compounds, and b) an organic compound having a boiling point of not higher than 250° C. in an amount of from 1 to 200% by weight relative to the addition polymer, wherein the stretched film has a linear expansion coefficient of at most 50 ppm/° C.; and wherein the stretched film is a non-crosslinked film;
wherein the addition polymer consisting of norbornene compounds has a glass transition temperature of not lower than 200° C.,
and wherein the addition polymer consisting of norbornene compounds include a repetitive structural unit represented by the following formula (1),

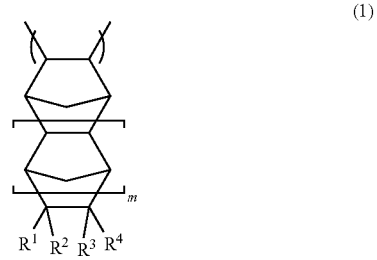

wherein $R^1$ to $R^4$ each independently represent a hydrogen atom; a functional group containing a heteroatom of Group 15 or 16 of the Periodic Table or a silicon atom; or a hydrocarbon group having from 1 to 20 carbon atoms and optionally having the functional group, wherein $R^1$ to $R^4$ may bond to each other to form a ring, and wherein m indicates an integer of 0 or 1 or more.

2. The method for producing a stretched film of an addition polymer consisting of norbornene compounds as claimed in claim 1, wherein the organic compound having a boiling point of not higher than 250° C. is used as a solvent in forming the film in a solution casting method.

\* \* \* \* \*